United States Patent
Olson et al.

(10) Patent No.: US 8,059,569 B1
(45) Date of Patent: Nov. 15, 2011

(54) CONTROL OF A WIRELESS COMMUNICATION SIGNAL TRANSMITTER OVER A WIRELESS BROADBAND NETWORK

(75) Inventors: Wayne E. Olson, Manassas, VA (US); Howard L. Gray, Cordova, TN (US); Timothy Edward Dudley, Grapevine, TX (US)

(73) Assignee: Sprint Communications Company L.P., Overland Park, KS (US)

( * ) Notice: Subject to any disclaimer, the term of this patent is extended or adjusted under 35 U.S.C. 154(b) by 203 days.

(21) Appl. No.: 12/504,203

(22) Filed: Jul. 16, 2009

(51) Int. Cl.
H04B 7/00 (2006.01)
(52) U.S. Cl. ........................................................ 370/310
(58) Field of Classification Search .................. 370/310, 370/311, 328, 351, 352, 464; 455/73, 571–574, 455/91, 92, 115
See application file for complete search history.

(56) References Cited

U.S. PATENT DOCUMENTS

| 5,732,074 A | 3/1998 | Spaur et al. |
| 6,031,455 A | 2/2000 | Grube et al. |
| 6,446,192 B1 | 9/2002 | Narasimhan et al. |
| 6,836,737 B2 | 12/2004 | Petite et al. |
| 6,891,838 B1 | 5/2005 | Petite et al. |
| 7,010,329 B2 * | 3/2006 | Livet et al. ............ 455/574 |
| 7,103,511 B2 | 9/2006 | Petite |
| 2006/0217152 A1 * | 9/2006 | Fok et al. ............ 455/557 |
| 2006/0271251 A1 * | 11/2006 | Hopkins ............ 701/23 |
| 2009/0195655 A1 * | 8/2009 | Pandey ............ 348/158 |

OTHER PUBLICATIONS

Bird Technologies Group, "Item # 5000-EX Digital Power Meter,", May 4, 2009, 2 pages, Bird Electronic Corporation.
Evdoinfo.com, "Merlin S720 EVDO Rev A for Sprint," Aug. 24, 2006, 5 pages, EVDOinfo.com, http://www.evdoinfo.com/content/view/806/40.
Gridconnect.com, "NET232-DCE (female) Intelligent Ethernet to Serial Cable Adapter $99," May 4, 2009, 4 pages, gridconnect.com, http://www.gridconnect.com/net232.html.
IT Dreams, "Linksys WRT54G3G-ST Sprint Mobile Router 802.11G," May 4, 2009, 2 pages, estore.it-dreamz.net, http://estore.it-dreamz.net/linksyswrt54g3g-stsprintmobilerouter80211g.aspx.
Sprint, "NASCAR Sprint FanView FAQs," May 4, 2009, 1 page, Sprint, http://www.sprintfanview.com/FAQ.aspx.
Sprint, "What is NASCAR Sprint FanView?," May 4, 2009, 1 page, Sprint, http://www.sprintfanview.com/ WhatIsFanview.aspx.

* cited by examiner

*Primary Examiner* — Dmitry H Levitan

(57) ABSTRACT

A method for controlling a wireless communication signal transmitter over a wireless broadband network is presented. In the method, transmitter commands for the transmitter are received over a wireless broadband network at a wireless broadband router. The transmitter commands are directed from the router over a first wired connection to the transmitter. Also, monitor commands for a monitoring device are received over the network at the router. The monitoring device is configured to monitor an electrical characteristic of the transmitter. The monitor commands are directed from the router over a second wired connection to a serial communication cable adapter. At the adapter, the monitor commands are converted into a serial communication format. The resulting serial monitor commands are transferred from the adapter over a serial communication connection to the monitoring device.

20 Claims, 6 Drawing Sheets

CONTROL OF A WIRELESS COMMUNICATION SIGNAL TRANSMITTER OVER A WIRELESS BROADBAND NETWORK

TECHNICAL BACKGROUND

Wireless communication systems may facilitate any of numerous types of wireless communication, such as cellular telephone service, wireless Internet access, and various other forms of wireless data exchange. Such systems typically employ one or more sets of fixed-location wireless communication equipment, such as transmitters, receivers, or transceivers, capable of providing communication service to multiple wireless communication devices located within some defined area surrounding the communication equipment. These wireless communication devices may include mobile telephone devices, personal digital assistants (PDAs), and the like.

To ensure proper functioning of the communication equipment, operators of the communication system may employ test equipment at or near each site of the communication equipment to monitor one or more aspects of the equipment to determine if the equipment is operating in a desirable manner. Presuming the use of test equipment that may be coupled to the Internet or another wide-area network (WAN), such monitoring may occur over a fixed wired connection, such as a typical DSL or cable modem connection, for each item of test equipment. As a result, a computer or other communication device may retrieve monitoring data produced by the test equipment at each fixed location of the communication equipment from a single remote location more convenient to the communication system operator.

OVERVIEW

Discussed herein is a method for controlling a wireless communication signal transmitter over a wireless broadband network. In the method, transmitter commands for the wireless communication signal transmitter are received over a wireless broadband network at a wireless broadband router. The transmitter commands are directed from the router over a first wired connection to the transmitter. Also received over the wireless broadband network at the router are monitor commands for a monitoring device configured to monitor an electrical characteristic of the transmitter. The monitor commands are directed from the router over a second wired connection to a serial communication cable adapter. The monitor commands are converted into a serial communication format at the adapter, and transferred from the adapter over a serial communication connection to the monitoring device.

In one implementation, at a communication device including a wireless broadband interface, one of the monitor commands is transmitted from the interface over the wireless broadband network to the router. A response to the monitor command is received at the interface of the communication device by way of the network from the router, wherein the response includes a value of the electrical characteristic of the transmitter. Based on the response, one of the transmitter commands is transmitted from the device by way of the interface over the network to the router, wherein the transmitter command instructs the transmitter to alter the electrical characteristic.

In another embodiment, a wireless communication signal transmission system includes a wireless communication signal transmitter, a monitoring device configured to monitor an electrical characteristic of the transmitter, a serial communication cable adapter coupled with a serial communication interface of the monitoring device, and a wireless broadband router coupled to the transmitter by way of a first wired connection and to the adapter by way of a second wired connection. The router is configured to direct transmitter commands received over a wireless broadband network to the first wired connection for the transmitter, and the direct monitor commands received over the network to the second wired connection for the monitoring device. The adapter is configured to convert the monitor commands to a serial format and transfer the serial version of the monitor commands to the monitoring device.

Also included is a communication device including a communication interface and control circuitry. The communication interface is configured to communicate over a wireless broadband network with a wireless broadband router coupled with a wireless communication signal transmitter and a monitoring device. The monitoring device is configured to monitor an electrical characteristic of the transmitter. The control circuitry is configured to transmit a monitor command by way of the communication interface over the network to the router. The control circuitry is further configured to receive a response to the monitor command at the communication interface by way of the network from the router, wherein the response comprises a value of the electrical characteristic of the transmitter. Based on the response, a transmitter command is transmitted by way of the interface over the network to the router, wherein the transmitter command instructs the transmitter to alter the electrical characteristic.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below may be combined in various ways to form multiple embodiments of the invention. As a result, the invention is not limited to the specific embodiments described below, but only by the claims and their equivalents.

Figure 1:
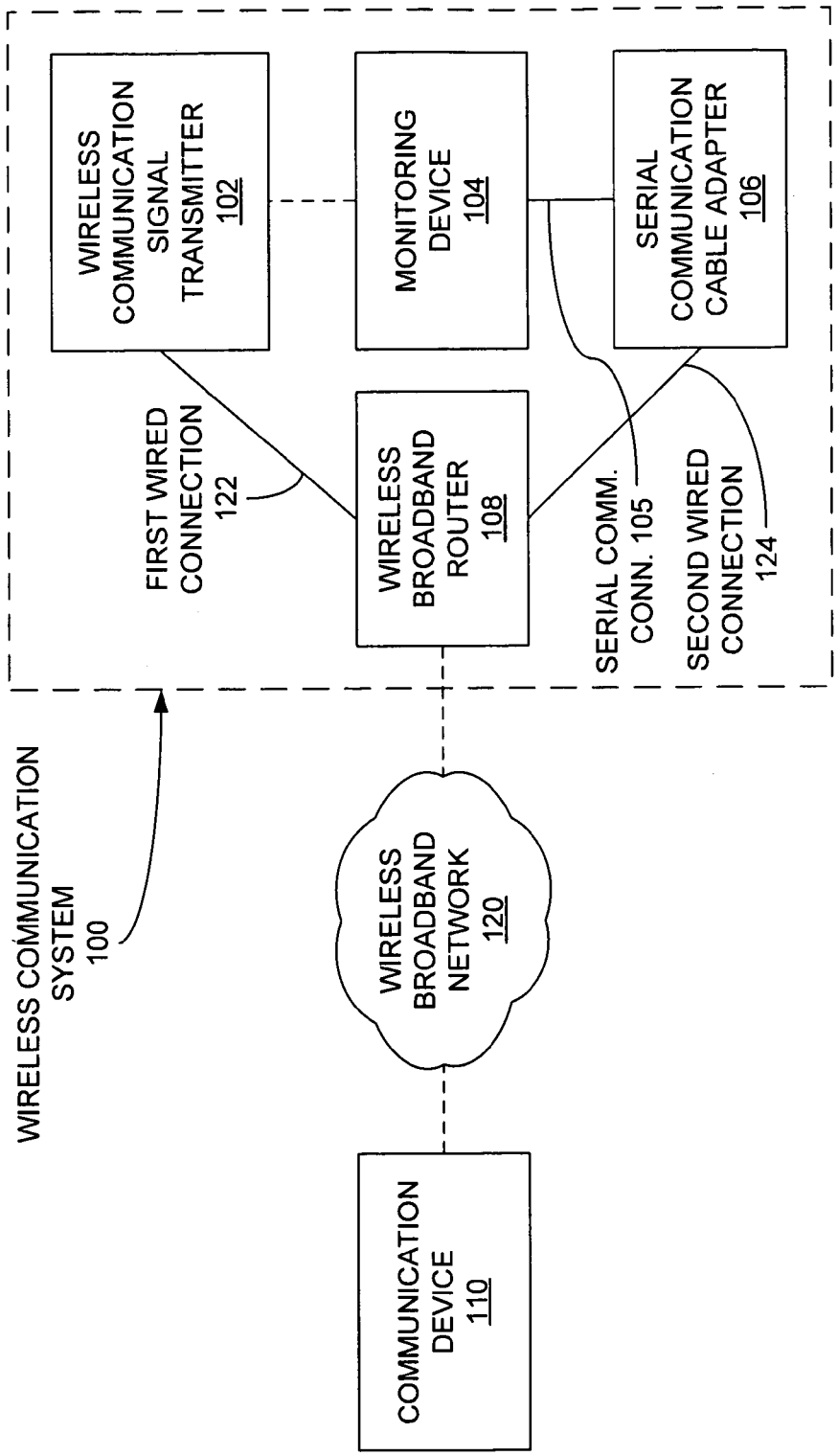
FIG. 1 is a block diagram of a wireless communication system coupled with a communication device through a wireless broadband network according to an embodiment of the invention.

FIG. 1 provides a block diagram of a wireless communication system 100 coupled with a communication device 110 through a wireless broadband network 120. The wireless communication system 100 includes a wireless communication signal transmitter 102 and a monitoring device 104 configured to monitor at least one electrical characteristic of the transmitter 102. Also included in the system 100 is a serial communication cable adapter 106 coupled with the monitoring device 104 by way of a serial communication connection 105. In addition, the system 100 includes a wireless broadband router 108 connected to the transmitter 102 by way of a first wired connection 122, and connected to the serial communication cable adapter via a second wired connection 124.

Figure 2:
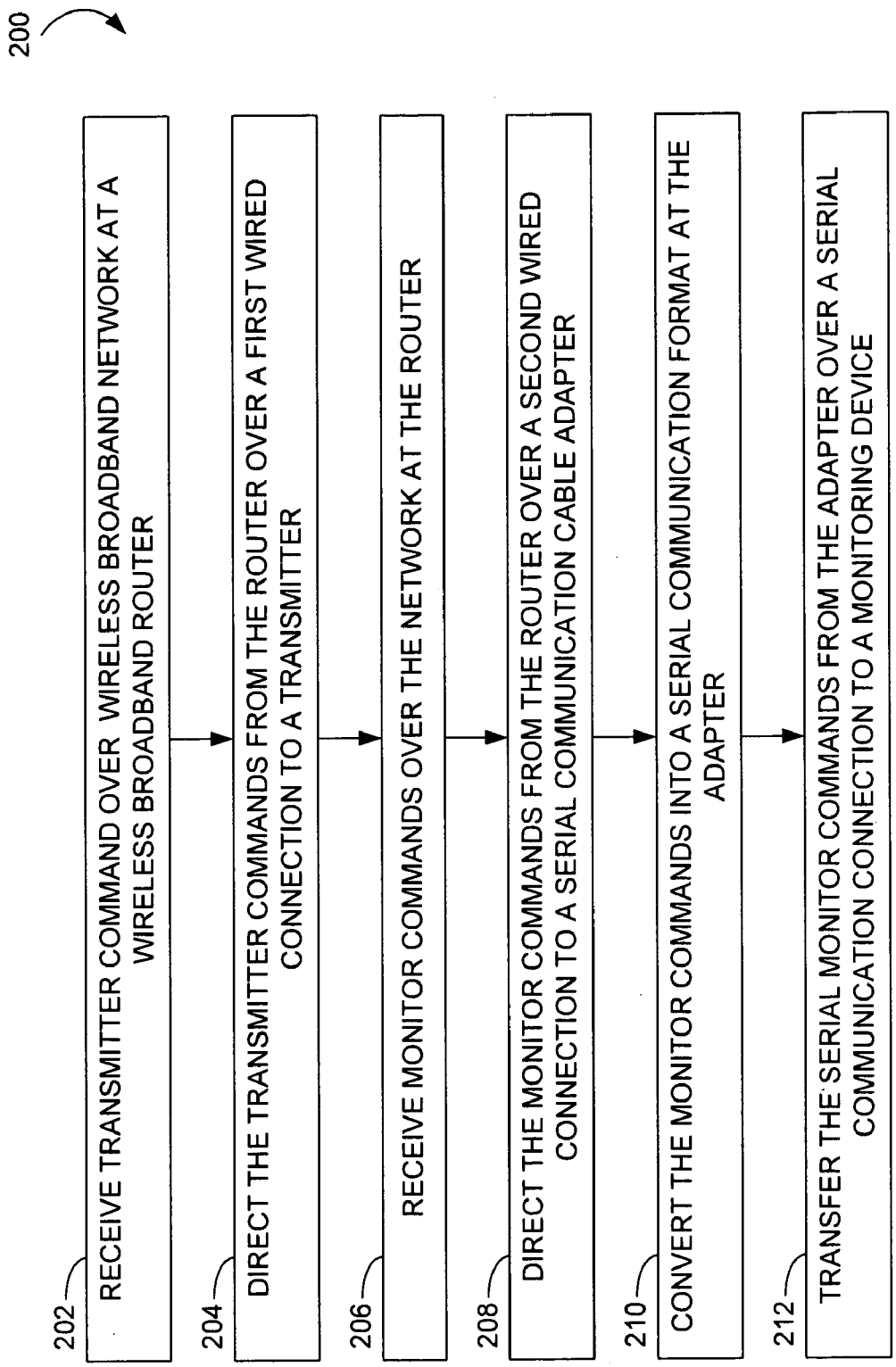
FIG. 2 is a flow diagram illustrating a method for controlling a wireless communication signal transmitter of the wireless communication system of FIG. 1 over the wireless broadband network according to an embodiment of the invention.

FIG. 2 is a flow diagram of a method 200 in one embodiment for controlling the transmitter 102 of FIG. 1 by way of the wireless broadband network 120 (also shown in FIG. 1). However, aspects of the method 200 may be applied to other wireless communication systems not specifically discussed herein while remaining within the scope of the invention. In the method 200, transmitter commands for the transmitter 102 are received from the communication device 110 over the network 120 at the router 108 (operation 202). The transmitter commands are directed from the router 108 over the first wired connection 122 to the transmitter 102 (operation 204). Monitor commands for the monitoring device 104 are also received from the communication device 110 over the network 120 at the router 108 (operation 206). The monitor commands are directed from the router 108 over the second wired connection 124 to the serial communication cable adapter 106 (operation 208). At the serial communication cable adapter 106, the monitor commands are converted into a serial communication format (operation 210). The serial monitor commands are then transferred from the adapter 106 over the serial communication connection 105 to the monitoring device 104 (operation 212).

While the operations 202-212 of FIG. 2 are presented in a specific order, other possible orders of execution, including concurrent execution of two or more of the operations, are possible in other implementations. In another embodiment, a computer-readable medium may have encoded thereon instructions executable by one or more processors for employing the method 200 of FIG. 2.

Employing a wireless communication system 100 as described above allows the communication device 110 to monitor and control the wireless communication signal transmitter 102 remotely by way of the wireless broadband network 120. As a result, the wireless communication system 100 need not have access to a fixed-location Internet connection to facilitate remote monitoring and control. This capability thus allows the wireless communication system 100 to be moved periodically, which is advantageous in some communication environments. Other potential advantages will be recognized in connection with other embodiments of the invention as described in greater detail below.

Figure 3:
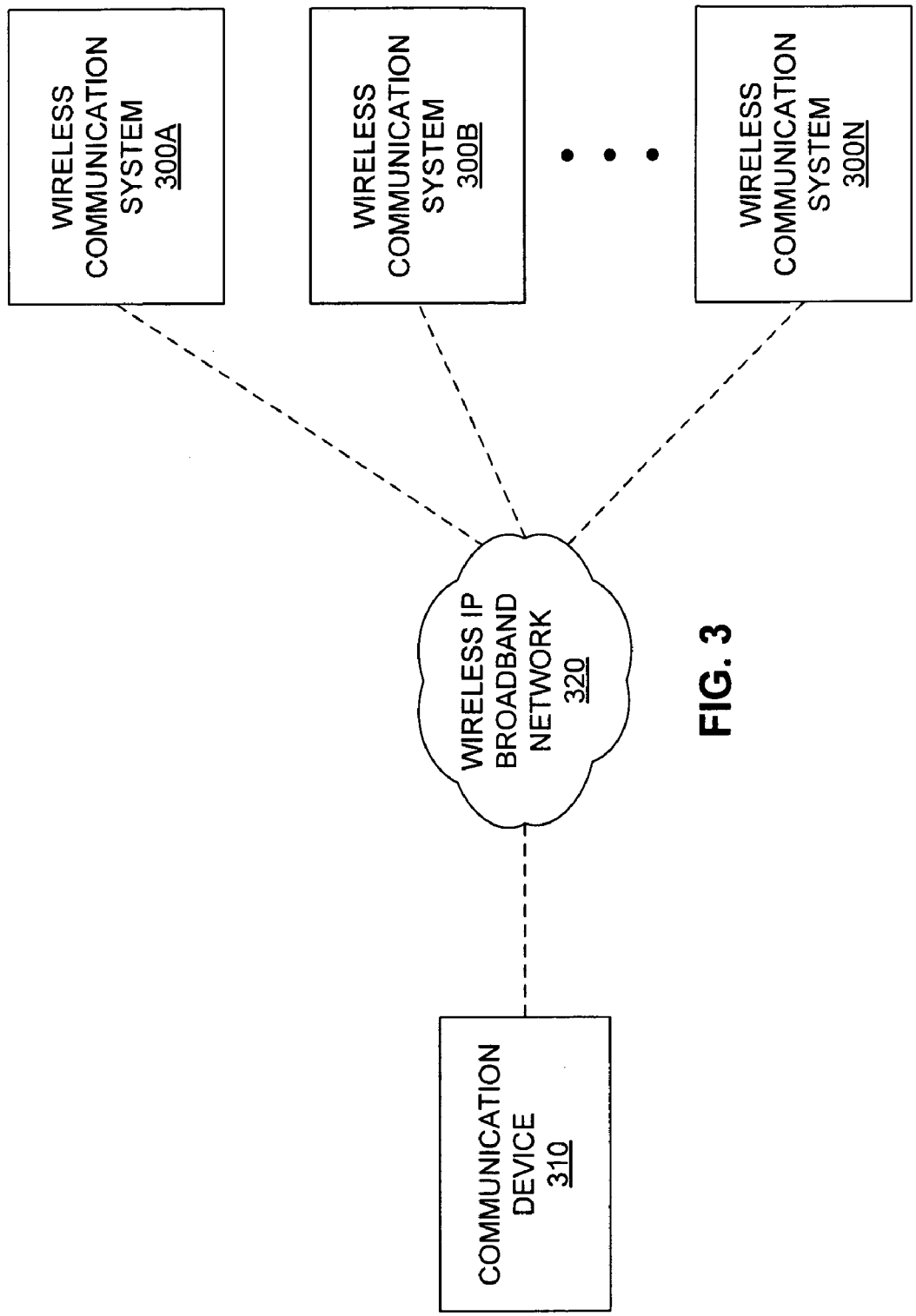
FIG. 3 is a block diagram of a plurality of wireless communication systems coupled with a communication device by way of a wireless Internet Protocol broadband network according to another embodiment of the invention.

FIG. 3 is a block diagram depicting multiple wireless communication systems 300A, 300B, . . . , 300N, with which a single communication device 310 may communicate by way of a wireless broadband network 320. In other implementations, each of the wireless communication systems 300 may be associated with its own separate communication device 310. In another example, the wireless communication systems 300 may be organized into multiple groups of one or more systems 300, with each group communicating with its own communication device 310.

Specific examples of the wireless communication systems 300 of FIG. 3 include digital video broadcast (DVB) transmission systems employed as part of the Sprint FanView® system provided for National Association for Stock Car Auto Racing (NASCAR) events, which delivers video, audio, statistics, and related information to patrons attending a racing event. In one implementation, each of the wireless communication systems 300 provides wireless video signals to a portion of the racing venue for display on personal handheld display devices made available to the attendees. As each NASCAR race during a racing season generally takes place at a different racetrack, the DVB transmission systems must be portable, as they are packaged, transported, and redeployed for each race. Thus, fixed access to a wide-area network, such as the Internet, to monitor and control the wireless communication systems 300 is problematic.

Figure 4:
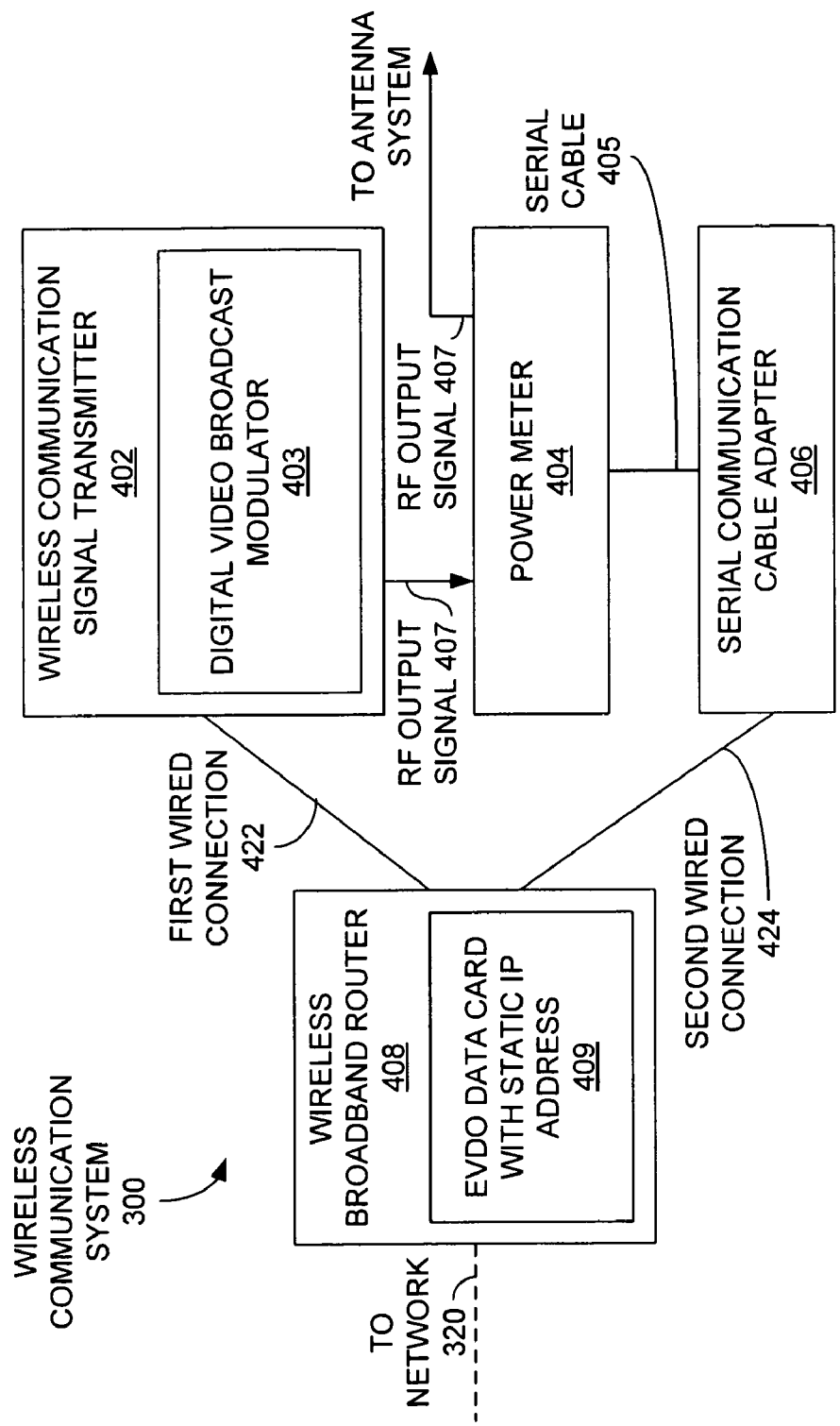
FIG. 4 is a block diagram of one of the wireless communication systems of FIG. 3 according to an embodiment of the invention.

An example of each of the wireless communication systems 300 of FIG. 3 is shown in greater detail in the block diagram of FIG. 4. Each system 300 includes a wireless communication signal transmitter 402, a power meter 404, a serial communication cable adapter 406 communicatively coupled with the power meter 404, and a wireless broadband router 408 coupled with the transmitter 402 and the adapter 406. In one implementation, each of these components is located in close proximity to each other to allow wired connections between several of the components.

The router 408 is configured to communicate with the communication device 310 over the wireless broadband network 320. In one example, the wireless broadband network 320 is an Evolution-Data Optimized (EVDO) wireless Internet Protocol (IP) data network potentially provided by a third party, although other wireless communication networks providing data transfer, such as a Worldwide Interoperability for Microwave Access (WiMAX) network, may be utilized in other arrangements. To allow use of the router 408 with an EVDO network 320, the router 408 provides a Personal Computer Memory Card International Association (PCMCIA) slot into which an EVDO network data card 409 is inserted to facilitate connectivity with the network 320. An example of such a router 408 is the Linksys® WRT54G3G-ST Sprint Mobile Router, and an example of the data card 409 is a Sprint Merlin 5720 EVDO data card. Other embodiments may employ a different router 408, such as a router that employs integrated circuitry providing the desired wireless network connectivity.

In one example, the data card 409 is configured with a static (i.e., non-changing) IP address for the network 320. Use of a static IP address thus allows the communication device 310 to access the data card 409 over the network 320 using that same IP address regardless of the number of times the router 408 has been disconnected from the network 320, such as what would occur if the router 408 were periodically relocated. However, a dynamic IP address, such as one obtained by way of the Dynamic Host Configuration Protocol (DHCP), may be utilized in other implementations.

Further, the router 408 is configured to communicate with the transmitter 402 and the adapter 406 over separate wired connections. In the particular example of FIG. 4, the router 408 is coupled with the transmitter 402 by way of a first wired Ethernet connection 422 and with the adapter 406 via a second wired Ethernet connection 424. In the example of FIG. 4, the router 408 includes at least two RJ45 Ethernet port connectors for connecting the transmitter 402 and the adapter 406 thereto.

In one implementation, the first wired Ethernet connection 422 and the second wired Ethernet connection 424 are each associated with a particular IP port number. In one specific implementation, the router 408 is configured to associate the first wired Ethernet connection 422 with port 80, which is often identified with web servers for transfer of HyperText Markup Language (HTML) web pages. As is described later, the transmitter 402 may provide such a web connection in one example. In this same example, the second wired Ethernet connection 424 is associated with port 10001 to distinguish the second Ethernet connection 424 from the first connection 422. Configuration of the router 408 to associate the Ethernet connections 422, 424 with the appropriate port numbers may occur by way of commands issued from the communication device 310 over the network 320, by way of the communication device 310 being coupled temporarily with the router 408 by way of an Ethernet port of the router 408, or by way of some other connection means.

When IP data packets are received at the router 408 from the network 320, the router 408 analyzes the received packets to determine where to route the packets. Thus, in the system of FIG. 4, the router 408 directs those packets indicating a destination port of 80 to the transmitter 402 over the first Ethernet connection 422, and directs packets denoting a destination port of 10001 to the serial adapter 406 by way of the second Ethernet connection 424. Other methods of distinguishing and directing the IP packets to their intended destination may be used in other configurations.

In the example of FIG. 4, the wireless communication signal transmitter 402 includes a digital video broadcast (DVB) modulator 403 for transmitting video signals wirelessly. More specifically according to one embodiment, the DVB modulator 403 accepts as input video data, such as data formatted according to a Motion Picture Experts Group (MPEG) standard, such as MPEG-2 or MPEG-4. This data is modulated according to a digital video broadcast format, such as DVB-H (Digital Video Broadcasting—Handheld) or another video broadcasting format, and then amplified, to yield a radio frequency (RF) output signal 407. In one implementation, the DVB modulators 403 of the multiple wireless communication systems 300 collectively form a single-frequency network (SFN) for the broadcasting of one or more digital video channels. The data for the channels may further be received by the modulators 403 from a signal video source (not shown in FIG. 3 or 4). A specific example of the DVB modulator 403 is the DVM 5000 DVB-T/H Modulator available from Unique Broadband Systems Ltd. In some implementations, the transmitter 402 may include other amplifier, transmitter, receiver, or transceiver components in addition to, or in lieu of, the DVB modulator 402.

One or more electrical aspects of the DVB modulator 403, such as the power output of the generated RF signal 407, may be controlled by way of transmitter or modulator commands received by the modulator 403. In FIGS. 3 and 4, the communication device 310 transmits the commands over the wireless broadband network 320 to the router 408, which directs the commands over the first wired Ethernet connection 432 to the modulator 403. In one example, the modulator 403 presents a web-based graphical user interface (GUI) through which multiple electrical and other technical parameters, including the RF signal 407 power output of the modulator 403, may be modified. Other electrical parameters associated with the transmitter 402 that may be monitored and modified may include the frequency or wavelength of the RF signal 407, and characteristics of any other output or internal signals generated by the transmitter 402.

In FIG. 4, the power meter 404 is coupled with the transmitter 402 to facilitate measurement of the power of the RF output signal 407. In one example, the power meter 404 is coupled by coaxial cables to the transmitter 402, whereby the RF output signal 407 is passed from the modulator 403, through an amplifier stage (not shown in FIG. 4), through the meter 404, to an antenna system (also not shown in FIG. 4) for ultimate wireless transmission. According to other examples, the voltage standing wave ratio (VSWR) of the RF output signal 407 may be measured after being applied to a signal antenna system (not shown in FIG. 4). In response, the power meter 404 measures the power of the RF output signal 407, such as an instantaneous or average power value. In other embodiments, other electrical characteristics of the modulator 402 or other components of the transmitter 402 may be monitored in a similar manner.

One example of the power meter 404 is the Bird® 5000-EX RF Digital Power Meter coupled with a Bird® 5012 Wideband Power Sensor, both produced by Bird® Technologies Group. This particular unit, like many portable monitoring devices, provides a serial port configured to receive commands from, and generate responses to those commands to, a computer or other communication device directly coupled with the serial port.

To facilitate remote monitoring by way of the power meter 404, the serial communication cable adapter 406 couples the power meter 404 with the wireless broadband router 408. More specifically, the adapter 406 utilizes a serial cable 405 to connect the adapter 406 with the serial port of the power meter 404, and employs the second wired Ethernet connection 424 to communicate with the router 408 by way of an RJ45 connector on the adapter 406. A specific example of the adapter 406 is the NET232-DCE Intelligent Ethernet to Serial Cable Adapter by Grid Connect, Inc.

In operation, the wireless communication system of FIG. 4 is configured to receive modulator commands to be transferred from the broadband network 320 through the router 408 to the modulator 403, as well as monitor commands to be forwarded from the network 320 by way of the router 408 and the serial communication cable adapter 406 to the power meter 404. Similarly, responses and other communications generated in the modulator 403 and the meter 404 may be transferred back through the router 408 to the network 320.

Communicating with the modulator 403 and the meter 404 via the network 320 is the communication device 310 of FIG. 3. A more detailed view of the communication device 310 is presented in FIG. 5. The communication device 310, such as a desktop or laptop computer, a PDA, or a cellular phone, includes a communication interface 512, control circuitry 514, and a user interface 516. Other components, such as data storage devices and the like, may also be included in the communication device 310, but are not explicitly discussed herein to simplify the following discussion.

Figure 5:
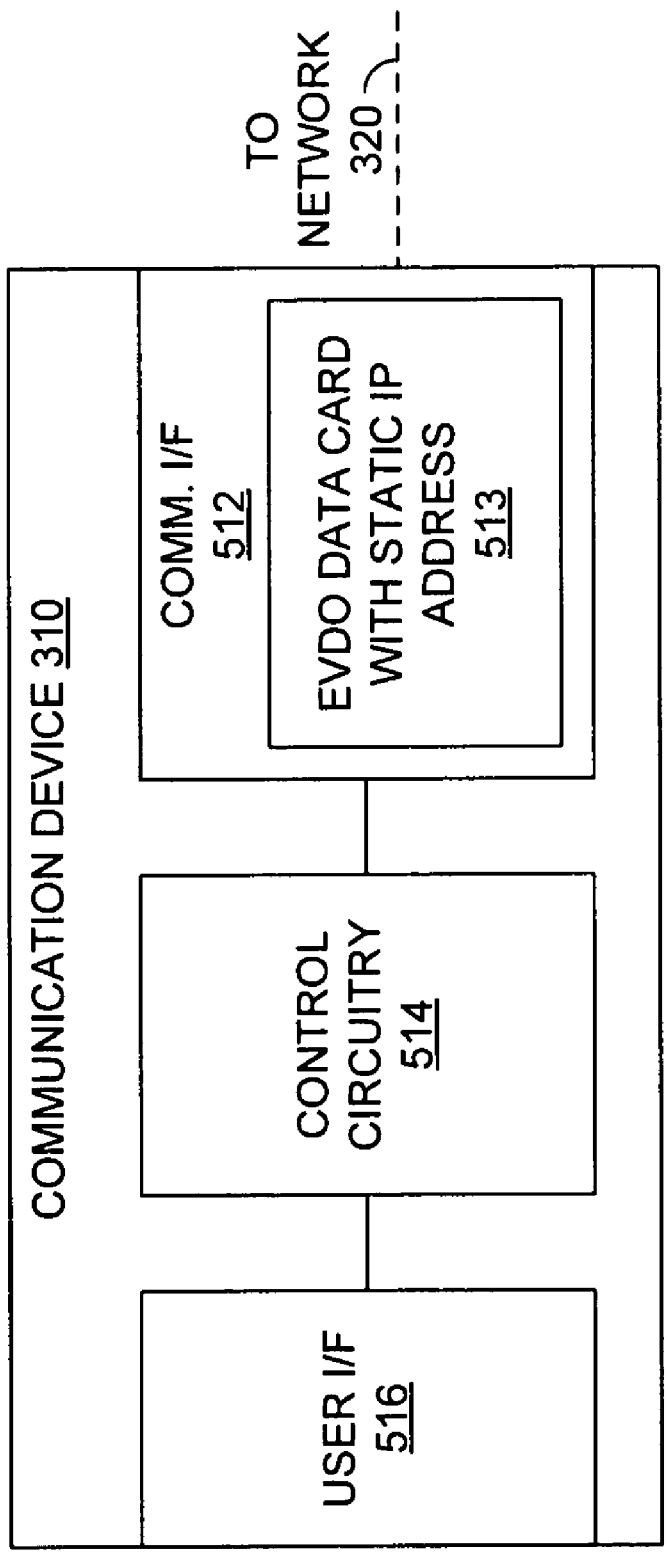
FIG. 5 is a block diagram of the communication device of FIG. 3 according to an embodiment of the invention.

The communication interface 512 of FIG. 5 is configured to communicate over the wireless broadband network 320 with the router 408 of FIG. 4. Similar to the broadband router 408 of the wireless communication system 300 shown in FIG. 4, the communication interface 512 may include a PCMCIA slot into which an EVDO network data card 513 is inserted to provide connectivity with the network 320. As before, an example of the data card 513 may be a Sprint Merlin S720 EVDO data card, although other forms of network interface cards or circuits may be employed to a similar end.

As with the data card 409 of FIG. 4, the data card 513 of FIG. 5 may be configured with a static address, such as a static IP address, for the network 320 to allow communication between the router 408 of the wireless communication system 300 and the communication device 310 by utilizing the same IP address regardless of how often the communication device 310 is disconnected from the network 320, such as for the purpose of relocation to another geographic area. In other implementations, a dynamic IP address, such as one generated via DHCP, may be utilized for the address of the data card 513.

The control circuitry 514 of the communication device 310 is configured to transmit commands to both the modulator 403 and the power meter 404 of the wireless communication system 300 by way the communication interface 512 and the wireless network 320, as well as to receive responses to those commands, as is described more fully below. The control circuitry 514 may include one or more processors, such as microprocessors, microcontrollers, or digital signal processors (DSPs), capable of performing the various tasks described hereinafter. In another example, the control circuitry 316 may include hardware components or devices, or a combination of hardware and software elements, for performing these same operations.

Also included in the communication device 310 may be a user interface 516 coupled with the control circuitry 510 and configured to receive user input and provide output to the user regarding the commands and associated responses discussed above. The user interface 516 may include any components or circuitry providing this functionality, such as liquid crystal diode (LCD) or other types of visual displays, audio speakers, keyboards, mouse devices, touch pads, and other types of input and/or output devices.

In the specific communication system 300 of FIG. 5, an operator or user of the communication device 310 may issue commands to, and receive responses and status from, the modulator 403 by way of HTML web pages provided by the modulator 403, as discussed above. As a result, the user need only employ a web browser executing in the control circuitry 514 to communicate with the modulator 403.

Regarding the power meter 404, the communication device 310 may employ a software communication module configured specifically to issue commands to, and receive status and responses from, the power meter 404 by way of a serial port of the communication device 310, as if the communication device 310 were coupled directly with the power meter 404 by way of a serial communication cable. To enable communication over the wireless broadband network 320 between the communication device 310 and the power meter 404, the software communication module is configured to direct its communications for the meter 404 through a "virtual" serial COM port (i.e., software not associated with a hardware serial port). In response to communications generated by the software communication module, the virtual COM port reformats the generated communications into an appropriate wireless broadband network protocol, such as IP, and redirects the reformatted communications to the communication interface 512 and the data card 513 for transmission over the network 320 to the desired router 408 according to the network address of the router 408. Similarly, communications received from the meter 404 by way of the adapter 406 and the router 408 are received at the communication interface 512 and directed to the virtual COM port, which reformats and transfers the received communication to the software communication module associated with meter 404 communications.

Figure 6:
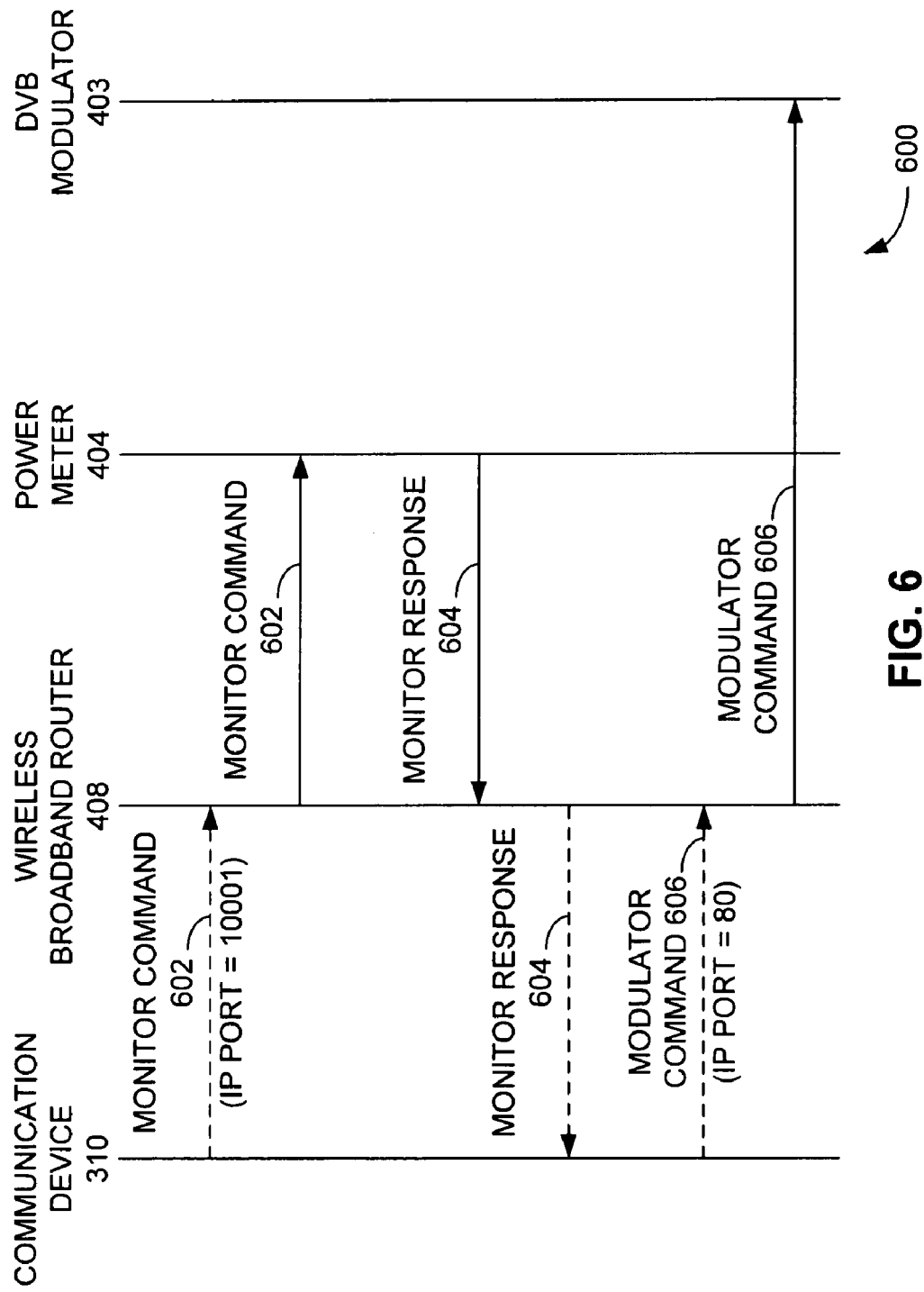
FIG. 6 is a diagram depicting communications among the communication device, the wireless Internet Protocol broadband router, the monitoring device, and the digital video broadcast modulator of FIGS. 3-5 according to an embodiment of the invention.

Based on the communication paths discussed above between the communication device 310 and the wireless communication system 300, the communication device 310 may control the operation of the included modulator 403 based on monitoring information generated by the power meter 404 from a remote location over the wireless network 320. FIG. 6 is a communication diagram 600 illustrating one potential series of information exchanges between the communication device 310 and one of the communication systems 320 of FIG. 3 to provide this monitoring and control functionality.

In FIG. 6, the control circuitry 514 of communication device 310, by way of the communication interface 512, generates a monitor command 602 with an IP port number of 10001, indicating that the command 602 is intended for the power meter 404. The monitor command 602 may, for example, request the current or most recent power of the RF output signal 407 of the signal transmitter 402 that has been captured by the meter 404. Upon receiving the monitor command 602, the router 408 directs the monitor command 602 via the second wired Ethernet connection 424 and the adapter 406 based on the IP port number included with the command 602.

In response to the monitor command 602, the power meter 404 generates a monitor response 604, and transfers the response 604 by way of the adapter 406 and the router 408 over the network 320 to the communication device 310. The response 604 may be the power value associated with the RF output signal 407 that was requested in the initiating monitor command 602.

In reaction to the response 604, as presented to the user by way of the user interface 516, the user of the communication device 310 may determine that a change in the power output level of the modulator 403 is in order. Thus, the user may employ the user interface 516 to cause the control circuitry 514 to generate a modulator command 606 for modifying the output level, including a port number of 80 with the command 606 to signify the modulator 403 as the command 606 destination. As described earlier, the user may initiate such a command by way of an HTML web page presented by the modulator 403 over the network 320. The control circuitry 514 also causes the communication interface 512 to transmit the modulator command 606 over the network 320 to the router 408, which forwards the command 606 over the first wired Ethernet connection 422 to the modulator 403. In response, the modulator 403 executes the command 606 to modify the power of the RF output signal 407 accordingly.

The series of commands and responses depicted in FIG. 6 may be performed periodically to maintain the power of the RF output signal 407 within a predetermined range of values. The communication device 310 may engage in such communications with each of the wireless communication systems 300. Further, the communication device 310 may perform similar control over other electrical characteristics of the modulator 403, other portions of the wireless communication signal transmitter 402, and other components associated with the wireless communication system 300.

Various embodiments as described above facilitate remote monitoring and control of one or more geographically distinct wireless communication systems by way of a communication device over a separate wireless broadband network, access to which may be provided by way of a readily-available wireless broadband communications carrier. Use of the wireless broadband network thus eliminates any need for a wired communication connection, such as a cable or DSL connection for each of the separate wireless communication systems. Further, any number of monitoring devices co-located with the communication equipment being monitored may share the same wireless broadband router to simplify deployment of each wireless communication system. To that end, some monitoring devices and communication equipment may be coupled with an adapter, such as an Ethernet-to-serial-port adapter, to allow connection of those devices to communication over the broadband network by way of the router. Further, use of a static network address for either or both of the router and the controlling communication device may simplify deployment for those portable communication systems which are moved periodically from one location or venue to another.

The above description and associated figures teach the best mode of the invention. The following claims specify the scope of the invention. Note that some aspects of the best mode may not fall within the scope of the invention as specified by the claims. Also, while many of the embodiments described above specifically involve the use of an IP-based network to remotely control the output signal power of a DVB modulator, other wireless communication equipment may be monitored in varying ways using any type of wireless broadband network in different embodiments of the invention to similar benefit. Those skilled in the art will also appreciate that the features described above can be combined in various ways to form multiple variations of the invention. As a result, the invention is not limited to the specific embodiments described above, but only by the following claims and their equivalents.

What is claimed is:

1. A method for controlling a wireless communication signal transmitter over a wireless broadband network, the method comprising:
   receiving transmitter commands for the wireless communication signal transmitter over a wireless broadband network at a wireless broadband router;
   directing the transmitter commands from the wireless broadband router over a first wired connection to the wireless communication signal transmitter;
   receiving monitor commands for a monitoring device over the wireless broadband network at the wireless broadband router, wherein the monitoring device is configured to monitor an electrical characteristic of the wireless communication signal transmitter;
   directing the monitor commands from the wireless broadband router over a second wired connection to a serial communication cable adapter;
   converting the monitor commands into a serial communication format at the serial communication cable adapter; and
   transferring the serial monitor commands from the serial communication cable adapter over a serial communication connection to the monitoring device.

2. The method of claim 1, further comprising:
   at the wireless broadband router, associating a first port number with the first wired connection; and
   at the wireless broadband router, associating a second port number with the second wired connection;
   wherein the transmitter commands comprise the first port number, and the monitor commands comprise the second port number; and
   wherein directing the transmitter commands at the wireless broadband router is based on the first port number, and directing the monitor commands at the wireless broadband router is based on the second port number.

3. The method of claim 1, wherein:
   the wireless broadband router is associated with a static network address of the wireless broadband network.

4. The method of claim 3, wherein:
   the wireless broadband network comprises a wireless Internet Protocol network; and
   the static network address comprises a static Internet Protocol address.

5. The method of claim 1, wherein the first wired connection and the second wired connection are wired Ethernet connections.

6. The method of claim 1, further comprising:
   transmitting one of the monitor commands from a wireless broadband interface of a communication device over the wireless broadband network to the wireless broadband router;
   receiving a response to the one of the monitor commands at the wireless broadband interface of the communication device by way of the wireless broadband network from the wireless broadband router, wherein the response comprises a value of the electrical characteristic of the wireless communication signal transmitter; and
   based on the response, transmitting one of the transmitter commands from the communication device by way of the wireless broadband interface over the wireless broadband network to the wireless broadband router, wherein the one of the transmitter commands instructs the wireless communication signal transmitter to alter the electrical characteristic of the wireless communication signal transmitter.

7. The method of claim 6, further comprising:
   transferring the monitor commands toward a serial communication port of the communication device; and
   redirecting the monitor commands indicated for the serial communication port to the wireless broadband interface.

8. The method of claim 7, wherein the serial communication port is a virtual serial communication port.

9. A wireless communication system, comprising:
   a wireless communication signal transmitter;
   a monitoring device configured to monitor an electrical characteristic of the wireless communication signal transmitter;
   a serial communication cable adapter coupled with a serial communication interface of the monitoring device; and
   a wireless broadband router coupled to the wireless communication signal transmitter by way of a first wired connection and to the serial communication cable adapter by way of a second wired connection;
   wherein the wireless broadband router is configured to direct transmitter commands received over a wireless broadband network to the first wired connection for the wireless communication signal transmitter, and to direct monitor commands received over the wireless broadband network to the second wired connection for the monitoring device; and
   wherein the serial communication cable adapter is configured to convert the monitor commands to a serial format and transfer the serial monitor commands to the monitoring device.

10. The wireless communication system of claim 9, wherein:
    each of the transmitter commands comprises a first port number;
    each of the monitor commands comprises a second port number; and
    the wireless broadband router is configured to associate the first port number with the first wired connection, to associate the second port number with the second wired connection, to direct the transmitter commands received at the wireless broadband router to the first wired connection based on the first port number, and to direct the monitor commands received at the wireless broadband router to the serial communication cable adapter based on the second port number.

11. The wireless communication system of claim 9, wherein:
the wireless communication signal transmitter comprises a digital video broadcast modulator.

12. The wireless communication system of claim 9, wherein:
the wireless communication signal transmitter is one of a plurality of wireless communication signal transmitters operating collectively as a single frequency network.

13. The wireless communication system of claim 9, wherein:
the monitoring device is configured to monitor a power of an output signal generated by the wireless communication signal transmitter.

14. The wireless communication system of claim 9, wherein:
the wireless broadband router is associated with a static address of the wireless broadband network.

15. The wireless communication system of claim 14, wherein:
the wireless broadband network comprises an Internet Protocol network; and
the static address comprises a static Internet Protocol address.

16. The wireless communication system of claim 14, wherein:
the wireless broadband router comprises a removable wireless broadband network interface card configured with the static address.

17. A wireless communication system, comprising:
a communication device configured to transmit transmitter commands for a wireless signal transmitter over a wireless broadband network and transmit monitor commands for a monitoring device over the wireless broadband network, wherein the monitoring device is configured to monitor an electrical characteristic of the wireless communication signal transmitter;
a wireless broadband router configured to receive the transmitter commands, direct the transmitter commands over a first wired connection to the wireless communication signal transmitter, receive the monitor commands, and direct the monitor commands over a second wired connection to a serial communication cable adapter, wherein the serial communication cable adaptor converts the monitor commands into a serial communication format and transfers the serial monitor commands over a serial communication connection to the monitoring device.

18. The communication system of claim 17, further comprising:
the wireless broadband router further configured to associate a first port number with the first wired connection and a second port number with the second wired connection;
wherein the transmitter commands comprise the first port number and the monitor commands comprise the second port number; and
wherein the transmitter commands are directed based on the first port number and the monitor commands are directed based on the second port number.

19. The communication system of claim 17, wherein:
the wireless broadband router is associated with a static network address of the wireless broadband network.

20. The communication system of claim 19, wherein
the wireless broadband network comprises a wireless Internet Protocol network; and
the static network address comprises a static Internet Protocol address.

* * * * *